(12) United States Patent
Daul et al.

(10) Patent No.: US 7,647,263 B2
(45) Date of Patent: Jan. 12, 2010

(54) SYSTEM AND METHOD FOR PERFORMING RISK ANALYSIS

(75) Inventors: Stéphane Daul, Fribourg (CH); Filip Lindskog, Stockholm (SE); Alexander McNeil, Horgen (CH)

(73) Assignee: Swiss Reinsurance Company, Zürich (CH)

( * ) Notice: Subject to any disclaimer, the term of this patent is extended or adjusted under 35 U.S.C. 154(b) by 368 days.

(21) Appl. No.: 10/547,296

(22) PCT Filed: Sep. 19, 2003

(86) PCT No.: PCT/CH03/00633

§ 371 (c)(1), (2), (4) Date: May 15, 2006

(87) PCT Pub. No.: WO2005/029373

PCT Pub. Date: Mar. 31, 2005

(65) Prior Publication Data

US 2007/0027698 A1 Feb. 1, 2007

(51) Int. Cl. *G06Q 40/00* (2006.01)
(52) U.S. Cl. .................................. 705/36 R
(58) Field of Classification Search ............ 705/38, 705/36 R, 35

See application file for complete search history.

(56) References Cited

U.S. PATENT DOCUMENTS

| | | | | |
|---|---|---|---|---|
| 7,337,137 | B2* | 2/2008 | Zosin et al. | 705/36 R |
| 2003/0061152 | A1* | 3/2003 | De et al. | 705/38 |
| 2005/0027645 | A1* | 2/2005 | Lui et al. | 705/38 |
| 2005/0209959 | A1* | 9/2005 | Tenney | 705/39 |
| 2008/0005002 | A1* | 1/2008 | Ferris | 705/36 R |

OTHER PUBLICATIONS

Rüdiger Frey, Alexander J. McNeil, and Mark A. Nyfeler: "Copulas and credit models", pp. 1-8, Oct. 2001.
Paul Embrechts, Alexander McNeil, and Daniel Straumann: "Correlation and Dependence in Risk Management: Properties and Pitfalls", pp. 1-37, Aug. 1999.

* cited by examiner

*Primary Examiner*—Hani Kazimi
(74) *Attorney, Agent, or Firm*—Oblon, Spivak, McClelland, Maier & Neustadt, L.L.P.

(57) ABSTRACT

A computerized data processing system for performing risk analysis of a portfolio, the system including a modeling and calibration unit configured to describe risk factors as random variables, the random variables being related to each other by a correlation matrix; an input unit configured to enter or choose calibration data and to obtain, by using the modeling and calibration unit, values for parameters that describe the degree of freedom for sub-vectors and to obtain values for the correlation matrix for the random variables, to enter or choose at least one risk mapping function, and to enter portfolio data of a portfolio to be analyzed; a simulation unit configured to simulate realization of the risk factors by using the correlation matrix; and an output unit configured to generate output data resulting from the simulation unit in a form of at least one of a risk measure or a price.

11 Claims, 1 Drawing Sheet

SYSTEM AND METHOD FOR PERFORMING RISK ANALYSIS

BACKGROUND OF THE INVENTION

The present invention relates to a system and a computer implemented method for performing risk analysis of a portfolio.

The financial services industry, especially the financial risk management departments and the financial security pricing departments of insurance and re-insurance companies and banks, has established in the past tools and means for estimating their financial risk. Such risks can be associated with credit instruments and portfolios of credit instruments, such as bonds and loans. Such risks can also be associated with equity portfolios of various currencies or insurance and reinsurance liabilities.

These tools and means are based on models, based on which simulations are performed to generate possible valuation scenarios. These simulations generally use the Monte Carlo method or other appropriate methods. The models use probability distributions and are calibrated with historical data. Such historical data may be obtained from various sources, such as DataStream™.

These simulations are usually implemented in computer software as part of a financial services system and are run on computer hardware.

The input data for the simulations are risk factors, which are handled as random variables. Such risk factors can be equity indices, foreign exchange rates, interest rates, or insurance loss frequencies and severities. The result or output data of such simulations is at least one risk measure in the form of a numerical quantity or value. Usually, several risk measure values of different types can be obtained.

These risk measure values will be forwarded to an analyst or an actuary or an underwriter, i.e. a human representative of a financial services company. These risk measure values enable him to decide whether or not any actions should be taken to reduce the risk. Such actions can be changes in a credit or equities portfolio, or in a portfolio of insurance and reinsurance liabilities.

The risk measures usually consist of a variety of values, such as the maximum value obtained, the standard deviation of the simulation, a shortfall, usually the 99% shortfall, or a value-at-risk (VAR™). The VAR™ is the greatest possible loss that the company may expect in the portfolio in question with a certain given degree of probability during a certain future period of time. The full distribution itself can be the risk measure as well.

Typically a large number of risk factors have to be considered. Therefore, multidimensional probability distributions have to be used. As the risk measures are often determined at the tail of such distributions, a precise modelling of the tail dependency is important.

Furthermore, the dependency of the risk factors has to be considered. However, when using a linear correlation, the dependency is often not modelled adequately. One known solution to better model dependency is the use of copulas.

These copulas are well known in the state of the art. They are joint distribution functions of random vectors with standard uniform marginal distributions. They provide a way of understanding how marginal distributions of single risks are coupled together to form joint distributions of groups of risks.

Different kinds of copulas are known. Examples of closed form copulas are the Gumbel and the Clayton copula. Examples of implicit copulas, i.e. copulas for which no closed form exists, are the Gaussian copula and the t-copula.

It has become increasingly popular to model vectors of risk factor log returns with so-called meta-t distributions, i.e. distributions with a t-copula and arbitrary marginal distributions. The reason for this is the ability of the t-copula to model the extremal dependence of the risk factors and also the ease with which the parameters of the t-copula can be estimated from data. In Frey Rüdiger et al., "copulas and credit models" RISK, October 2001, p.p. 111-114, the use of such t-copulas for modelling credit portfolio losses is described. The disclosure thereof is herein implemented by reference.

We will recall therefore only the basic definitions and properties of t-distributions and t-copulas. For more on copulas in general, see NELSEN, R. (1999): An Introduction to copulas. Springer, New York, or EMBRECHTS, P., A. MCNEIL, AND D. STRATTON (2002): "Correlation and Dependence in Risk Management: Properties and Pitfalls," in Risk Management: Value at Risk and Beyond, ed. By M. Dempster, pp. 176-223. Cambridge University Press, Cambridge.

Before describing the state of the art and the present invention in greater detail it is helpful to define the various variables and values. The following notation is used in the description of the prior art as well as of the invention:

d dimension, number of risk factors
$R^d$ the d-dimensional usual real vector space
$E(X)$ expected value of the random variable X
$Var(X)$ variance of the random variable X
$Cov(X,Y)$ covariance of the random variables X and Y
X,Y,Z random vectors
$Cov(X)$ covariance matrix of X
$\nu$ number of degrees of freedom
$\Sigma$ covariance matrix
$N_d(0,\Sigma)$ d-dimensional Gaussian distribution with mean 0 and covariance $\Sigma$
$\phi$ univariate Gaussian distribution function
$\chi_\nu^2$ Chi Square distribution with degree of freedom $\nu$
$\rho$ correlation matrix
$t_\nu$ Student's t distribution function with degree of freedom $\nu$
$t_\nu^{-1}$ Student's t quantile function
$t_{\nu,\rho}^d$ Student's t d-dimensional distribution function with correlation matrix $\rho$ and degree of freedom $\nu$
$\Gamma$ usual gamma function
det A determinant of matrix A
$H_k$ arbitrary univariate distribution function
U random variable uniformly distributed on [0,1]
$\tau(X,Y)$ Kendall's tau rank correlation for random variables X and Y
$a_k$ credit multi-factor model parameters
$P\lfloor A \rfloor$ probability of occurrence of event A $P\lfloor X \leq x \rfloor$ probability that X is lower or equal than x
$\lambda_k$ counterparty idiosyncratic parameter
$E_k$ credit exposure on counterparty k
$l_k$ loss given default Let $Z \sim N_d(0,\Sigma)$ and U (random variable uniformly distributed on [0,1]) be independent. Furthermore, G denotes the distribution function of $\sqrt{\nu/x_\nu^2}$ and $R=G^{-1}(U)$.

Then the $R_d$—valued random vector Y given by $$Y=(RZ_1,RZ_2,RZ_3,\ldots,RZ_d)' \qquad (1)$$

has a centered t-distribution with $\nu$ degrees of freedom. Note that for $\nu>2$, $$Cov(Y) = \frac{\nu}{\nu-2}\Sigma.$$

By Sklar's Theorem, the copula of Y can be written as $$C_{\nu,\rho}^t(u) = t_{\nu,\rho}^d(t_\nu^{-1}(u_1), \ldots, t_\nu^{-1}(u_d)), \quad (2)$$

where $\rho_{i,j} = \Sigma_{ij}/\sqrt{\Sigma_{ii}\Sigma_{jj}}$ for $i, j \in \{1, \ldots, d\}$ and where $t_{\nu,\rho}^d$ denotes the distribution function of $\sqrt{\nu}Z/\sqrt{S}$, where $S \sim \chi_\nu^2$ and $Z \sim N_d(0, \rho)$ are independent (i.e. the usual multivariate t distribution function) and $t_\nu$ denotes the marginal distribution function of $t_{\nu,\rho}^d$ (i.e. the usual univariate t distribution function). In the bivariate case the copula expression can be written as $$C_{\nu,\rho}^t(u,v) = \int_{-\infty}^{t_\nu^{-1}(u)} \int_{-\infty}^{t_\nu^{-1}(v)} \frac{1}{2\pi(1-\rho_{12}^2)^{1/2}} \left\{1 + \frac{s^2 - 2\rho_{12}st + t^2}{\nu(1-\rho_{12}^2)}\right\}^{-(\nu+2)/2} ds\, dt. \quad (3)$$

Note that $\rho_{12}$ is simply the usual linear correlation coefficient of the corresponding bivariate $t_\nu$-distribution if $\nu > 2$. The density function of the t-copula is given by $$c_{\nu,\rho}^t(u_1, \ldots, u_d) = \frac{1}{\sqrt{\det\rho}} \frac{\Gamma\left(\frac{\nu+d}{2}\right)\Gamma\left(\frac{\nu}{2}\right)^{d-1}}{\Gamma\left(\frac{\nu+1}{2}\right)^d} \cdot \frac{\prod_{k=1}^d \left(1 + \frac{y_k^2}{\nu}\right)^{-\frac{\nu+1}{2}}}{\left(1 + \frac{y'\rho^{-1}y}{\nu}\right)^{-\frac{\nu+d}{2}}}, \quad (4)$$

where $y_k = t_\nu^{-1}(u_k)$.

Let $H_1, \ldots, H_d$ be arbitrary continuous, strictly increasing distribution functions and let Y be given by (1) with $\Sigma$ a linear correlation matrix. Then $$x = (H_1^{-1}(t_\nu(Y_1)), \ldots, H_d^{-1}(t_\nu(Y_d)))' \quad (5)$$

has a $t_\nu$-copula and marginal distributions $H_1, \ldots, H_d$. The distribution of X is referred to as a meta-t distribution. Note that X has a t-distribution if and only if $H_1, \ldots, H_d$ are univariate $t_\nu$-distribution functions.

The coefficient of tail dependence expresses the limiting conditional probability of joint quantile exceedences. The t-copula has upper and lower tail dependence with $(\bar{t}_{\nu+1}(x) = 1 - t_{\nu+1}(x))$:

$$\lambda = 2\bar{t}_{\nu+1}(\sqrt{\nu+1}\sqrt{1-\rho_{12}}/\sqrt{1+\rho_{12}}) < 0,$$

in contrast with the Gaussian copula which has $\lambda = 0$. From the above expression it is also seen that the coefficient of tail dependence is increasing in $\rho_{12}$ and, as one would expect since a t-distribution converges to a normal distribution as $\nu$ tends to infinity, decreasing in $\nu$. Furthermore, the coefficient of upper (lower) tail dependence tends to zero as the number of degrees of freedom tends to infinity for $\rho_{12} < 1$.

The calibration of the copula parameters $(\rho, \nu)$ are typically done as follows:

(i) Kendall's tau $\rho(X_i, Y_j)$ is estimated for every pair of risk factor log returns. An estimate of the parameter $\rho$ in (2) is obtained from the relation $$\tau(X_i, Y_j) = \frac{2}{\pi} \arcsin(\rho_{ij}) \quad (6)$$

which holds for any distribution with strictly increasing marginal distribution functions and a copula of an elliptical distribution which has a density, i.e. essentially any meta-elliptical distribution one would consider in applications. Note that in high-dimensional applications an estimate of obtained from (6) may have to be modified to assure positive definiteness. This can be done by applying the so-called eigenvalue method, i.e. the negative eigenvalues are replaced by a small positive number. Other calibrations are possible too.

(ii) Transforming each log return observation $X_i$ with its respective distribution function, e.g. gaussian $N_1(0, \sigma_i)$ yields, under the meta-t assumption, a sample from a t-copula with known $\rho$-parameter. Finally, the degrees of freedom parameter $\nu$ is estimated by standard maximum likelihood estimation using (4).

In step (ii) the empirical marginals or fitted distribution functions from a parametric family can be used.

The simulation from t-copula comprises the following steps:

(i) Draw independently a random variate Z from the d-dimensional normal distribution with zero mean, unit variances and linear correlation matrix $\rho$, and a random variate U from the uniform distribution on $(0, 1)$.

(ii) Obtain R by setting $R \approx G_\nu^{-1}(U)$. By (1) we obtain a random variate Y from the t-distribution.

(iii) Finally, $$(t_\nu(Y_1), \ldots, t_\nu(Y_d))'$$

is a random variate from the t-copula

This meta-t assumption makes sense for risk factors of similar type, e.g. foreign exchange rates. However, it was found that it does not accurately describe the dependence structure for a set of risk factor log returns where the risk factors are of very different type, for example a mixture of stock indices, foreign exchange rates and interest rates.

It is a general problem of such models, that the number of available historical data is quite small, so that at least the tail dependency can hardly be modelled. Similar problems are also known in other fields, for example in the combination reinsurance portfolios, the reliability of industrial complexes or in the weather forecast.

SUMMARY OF THE INVENTION

It is therefore a technical object of the invention to provide a system and a computer implemented method for performing risk analysis by combining a multiple of interdependent risk factors, wherein real historical data are used for calibration of a model, the model being used as basis for simulations for predicting the present or the future, and wherein at least one risk measure is obtained which describes an actual or a future risk or a price is obtained. The inventive method and the method shall be more flexible and accurate than the known system based on the meta-t-model, but without the need to use more efficient data processing machines and without the need to have an increased number of input data based on historical data.

This is achieved by a system and a method according to claim 1 and 6, respectively.

The invention still uses t-copulas. However, in the inventive system and method, the financial risk factors, i.e. the random variables, are grouped into groups of different types and each group obtains its own degree-of-freedom parameter. Therefore, a random vector can be obtained which is partitioned into subvectors. Each subvector is properly described by a multi-dimensional t-distribution, wherein each multi-dimensional t-distribution has a different degree-of-freedom parameter and the groups in between each other still show dependency through correlation matrix and have tail dependency. Having built such a grouped t-copula model, this model can be calibrated using historical data in the same way as a t-copula model is calibrated with the exception that a maximum likelihood estimation of the multiple degrees of freedom parameters is performed separately on each of the multiple risk factor groups. Simulation is afterwards also performed in the same way as when using the t-copula model, and the same types of risk measure values are obtained.

It was empirically found, that when using the grouped t-copulas the resulting risk measure values are different from the one obtained by using the usual ungrouped t-copulas. It was therefore observed that the new system and method is better able to capture the risk in a large set of risk factors.

While the present invention will hereinafter be described in connection with a preferred embodiment and method of use, it will be understood that it is not intended to limit the invention to this embodiment. Instead, it is intended to cover all alternatives, modifications and equivalents as may be included within the spirit and scope of the present invention as defined in the appended claims.

BRIEF DESCRIPTION OF THE DRAWINGS

The present invention will be more clearly understood with reference to the following detailed description of preferred embodiments, taken in conjunction with the accompanying drawings, in which.

DETAILED DESCRIPTION OF THE PRESENT INVENTION

Figure 1:
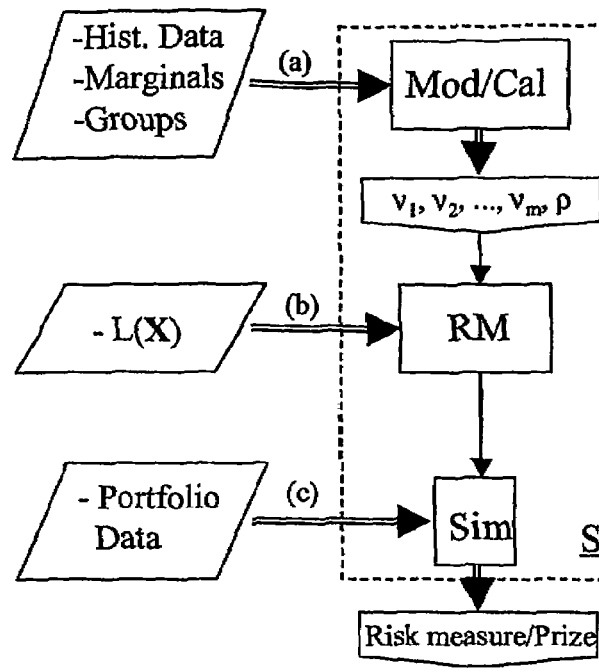
FIG. 1 illustrates the inventive system S and its input data and FIG. 2 illustrates the inventive system S being used for a multiple of portfolios.

In the system and method according to the invention, $Z \sim N_d(0,\rho)$, where $\rho$ is an arbitrary linear correlation matrix, is independent of U, a random variable uniformly distributed on [0,1]. Furthermore, $G_\nu$ denotes the distribution function of $\sqrt{\nu/x_\nu^2}$. According to the invention, a partition $\{1, \ldots, d\}$ into m subsets of sizes say $s_1, \ldots, s_m$ is made, wherein m is different from 1. $R_k = G_{\nu_k}^{-1}(U)$ for $k=1, \ldots, m$. If $$Y = (R_1 Z_1, \ldots, R_1 Z_{s_1}, R_2 Z_{s_1+1}, \ldots, R_2 Z_{s_1+s_2}, \ldots, R_m Z_d)' \quad (7)$$

then the random vector $(Y_1, \ldots, Y_{s_1})'$ has an $s_1$-dimensional t-distribution with $\nu_1$ degrees of freedom and, for $k=1, \ldots, m-1$, $(Y_{s_1+\ldots+s_k+1}, \ldots, Y_{s_1+\ldots+s_{k+1}})'$ has an $s_k+1$-dimensional t-distribution with $\nu_k+1$ degrees of freedom. Finally, $F_k$ denotes the distribution function of $Y_k$ and $H_1, \ldots, H_d$ are some arbitrary continuous distribution functions.

$$X = (H_1^{-1}(F_1(Y_1)), \ldots, H_d^{-1}(F_d(Y_d)))'$$

is therefore a generalisation of the meta-t model which allows different subsets of the components to have different degrees of freedom parameters $\nu_m$. Its copula model will hereinafter be called grouped t-copula model.

An example is given for d=4, i.e. for four risk factors, wherein each risk factor belongs to an equity. In this example, two of these four equities are from US, two of them are from Switzerland. This example is not representative since the models usually comprise a multiple of risk factors:

The 4 risk factors are described by 4 random variables that are dependent among each other. According to the invention, the 4 random variables are divided in groups. Here, we choose to divide them by country: i.e. we receive two groups of two risk factors, wherein each group represents a country.

In order be able to run a simulation according to the invention, a 4d random vector $Y=(Y_1,Y_2,Y_3,Y_4)$ with grouped t-copula dependency among the 4 components is needed.

By using standard techniques, the linear correlation $\rho$ for the 4 risk factors is determined. Then, two additional parameters $\nu_1$ and $\nu_2$ are introduced which will take into account tail dependency and further allows a different tail dependency in group 1 and 2. For example, $\nu_1=4$, which describes a high tail dependency, and $\nu_2=25$, which describes a low tail dependency.

$Z=(Z_1,Z_2,Z_3,Z_4)$, $G_1$ and $G_2$ are random variables having the following distribution:

$$Z \sim N_4(0,\rho)$$

$$G_1 \sim \sqrt{\nu_1/\chi_{\nu_1}^2}$$

$$G_2 \sim \sqrt{\nu_2/\chi_{\nu_2}^2}$$

with $x_\nu^2$ the usual Chi Square distribution.

U is independent of Z and uniformly distributed on [0,1]. The two new random variables $R_1$ and $R_2$ with distribution are $$R_1 = G_1^{-1}(U) \quad R_2 = G_2^{-1}(U)$$

Finally construct $$Y = \begin{pmatrix} R_1 Z_1 \\ R_1 Z_2 \\ R_2 Z_3 \\ R_2 Z_4 \end{pmatrix}$$

This is by definition a random vector having a grouped t-copula.

The grouped t-copula can be written down in a form similar to (3). However, because of the multidimensional case, the expression is quite complex and it is therefore not given explicitly. A person skilled in the art will know how to write this expression. We believe, that the properties of the grouped t-copula is best understood from (7) and the above stochastic representation. Moreover, for calibration of the grouped t-copula model with historical data and for simulation using the calibrated grouped t-copula model there is no need for an explicit copula expression, as can be seen below: The simulation from the inventive grouped t-copula is no more difficult than simulation from a t-copula. The simulation comprises the following steps:

(i) Draw independently a random variate Z from the d-dimensional normal distribution with zero mean, unit variances and linear correlation matrix $\rho$, and a random variate U from the uniform distribution on [0,1].

(ii) Obtain $R_1, \ldots, R_m$ by setting $R_k = G_{\nu_k}^{-1}(U)$ for $k=1, \ldots, m$. By (7) we obtain a random variate $(Y_1, \ldots Y_d)'$ from the grouped t-distribution.

(iii) Finally, $$(t_{\nu_1}(Y_1), \ldots, t_{\nu_1}(Y_{s_1}), t_{\nu_2}(Y_{s_1+1}), \ldots, t_{\nu_2}(Y_{s_1+s_2}), \ldots, t_{\nu_m}(Y_d))'$$

is a random variate from the grouped t-copula.

The calibration of this model is identical to that of the meta-t distribution except that the maximum likelihood (ML) estimation of the m degrees of freedom parameters $\nu_k$ has to be performed separately on each of the m risk factor groups. The key point is that the approximation $$\tau(X_i, X_j) \approx \tau(Z_i, Z_j) = \frac{2}{\pi}\arcsin(\rho_{ij}) \qquad (8)$$

is very accurate. Again, the eigenvalue method may have to be applied to assure positive definiteness.

In the following, a specific example is given to render the inventive method to be more clear:

We consider an internationally diversified credit portfolio with K counterparties. It is assumed that the systematic risk of each counterparty is adequately described by a set of risk factors, which are 92 country/industry equity indices as shown in Table 1. These risk factors are divided into 8 groups defined by country. The division according to the countries is only one way to form groups. Other divisions, such as divisions according to industrial sectors, are possible too.

According to the invention, this grouped t-copula is used to describe the dependence structure of the risk factors, and complete the model by specifying normally distributed marginals. The marginals for monthly returns are assumed to be normally distributed. Other distributions are possible as well.

For our example, we consider a single counterparty k and take a time horizon T=1 month. $I_k$ is the state variable for counterparty k at time horizon T. In this example, we consider only default events and not the impact of upgrades or downgrades on the credit quality. Therefore, we assume that $I_k$ takes values in $\{0,1\}$: the value 0 represents the default state, the value 1 is the non-default state.

$Y_k$ is a random variable with continuous distribution function $$F_k(x) = P[Y_k \leq x].$$

$d_k \in R$ and set $$I_k = 0 \Leftrightarrow Y_k \leq d_k \qquad (9)$$

The parameter $d_k$ is called the default threshold and $(Y_k, d_k)$ is the latent variable model for $I_k$. The following interpretation is put on $Y_k$. Let $A_t^k$ be the asset value of counterparty k at time t. We put $$Y_k = \log\left(\frac{A_T^k}{A_0^k}\right),$$

i.e. $Y_k$ is defined as the asset value monthly log return. A default occurs if the asset value log return falls below the threshold $d_k$.

We find parameters $a_k$ and $\lambda_k \in [0,1]$ such that $$Y_k = \sqrt{\lambda_k} a'_k X + \sqrt{1-\lambda_k} s_k \epsilon_k, \qquad (10)$$

where X is the vector of monthly risk factor log returns, with a grouped t-copula and normally distributed marginals, $E[X] = 0$ and $\epsilon_\kappa \sim N(0,1)$, independent of X. The model (10) says that asset value monthly log return can be linked to the risk factors by $a'_k X$, which gives the systematic component of the risk and same additional independent idiosyncratic component $\epsilon_K$. The parameter $\lambda_k$ is the coefficient of determination for the systematic risk (how much of the variance can be explained by the risk factors) and $$s_k^2 = \text{Var}(Y_k) = a'_k \text{Cov}(X) a_k.$$

Let $\pi_k$ be the unconditional probability of default for counterparty k, i.e. $\pi_k = F_k(d_k) \cdot \pi_k$ is assumed to be given from some internal or external rating system or other procedures. The conditional probability of default for counterparty k given the risk factors X can be written as $$Q_k(X) = P[Y_k \leq d_k \mid X] = \Phi\left(\frac{F_k^{-1}(\pi_k) - \sqrt{\lambda_k} a'_k X}{\sqrt{1-\lambda_k} \sqrt{a'_k \text{Cov}(X) a_k}}\right),$$

where $\Phi$ denotes the standard normal cumulative distribution function. In the classical model, $Y_k$ is normally distributed and thus the $\pi_k$-quantile $F_k^{-1}(\pi_k)$ can be easily computed. Here, the distribution function of $Y_k$ is unknown: $F_k^{-1}(\pi_k)$ is replaced by the empirical quantile estimate $\hat{F}_k^{-1}(\pi_k)$. Consequently, the estimated conditional probability of default $\hat{Q}_k(X)$ is obtained by replacing $F_k^{-1}(\pi_k)$ by $\hat{F}_k^{-1}(\pi_k)$ in the equation for $\hat{Q}_k(X)$.

This default model described by equations (9) and (10) is applied to each single counterparty in the credit portfolio. The counterparties defaults are handled as being conditionally independent, given the risk factors X, i.e. the $\epsilon_\kappa$'s are independent.

For each scenario X for the risk factors, counterparty defaults are simulated from independent Bernoulli-mixture distributions with parameters $\hat{Q}_k(X)$. Naturally, one could also simulate $Y_k$ using equation (8) so that a default occurs if the simulated $Y_k$ is smaller than the estimated default threshold $\hat{F}_k^{-1}(\pi_k)$ The advantage of using the Bernoulli-mixture model is that it can be easily extended to a Binomial-mixture model for a sub-portfolio of homogeneous counterparties.

$I_k(X) \in \{0,1\}$ is the conditional default indicator for counterparty k, $E_k$ is the corresponding exposure and $l_k$ is the loss given default. Then $L(X) = \Sigma_{k=1}^K I_k(X) l_k E_k$ gives the total credit loss under scenario X.

In summary, the credit loss distribution is obtained by a three stage procedure:

(i) Simulation of the monthly risk factor log returns X from a grouped t-copula with normal marginals;

(ii) For each counterparty k, simulation of the conditional default indicator $I_k(X) \in \{0,1\}$ from a Bernoulli-mixture model with conditional default probability $\hat{Q}_k(X)$;

(iii) Estimation of the credit loss distribution over a large set of scenarios for X, by integrating exposures and loss given default in the loss function L(X).

In this example, we calibrate the grouped t-copula and the normally distributed marginals using monthly risk factor log returns from 1992 to 2002 (hence 120 observations) obtained from DataStream™. Table 1 shows the estimated degrees of freedom parameters for various subsets of risk factors and the overall estimated degrees of freedom parameter. Because of the difference between the various subset degrees of freedom parameters a grouped t-copula is more appropriate for describing the dependence structure.

| Set | Number of risk factors | ν |
| --- | --- | --- |
| AUS Indices | 9 | 15 |
| CAN Indices | 14 | 24 |
| CH Indices | 4 | 19 |
| FRA Indices | 5 | 67 |
| GER Indices | 10 | 65 |
| JPN Indices | 15 | 14 |
| UK Indices | 15 | 17 |
| US Indices | 20 | 21 |
| All | 92 | 29 |

Table 1: Estimated degrees of freedom ν for various sets of risk factors. The country equities indices are for major industrial sectors.

The credit portfolio contains K=200 counterparties with the same unconditional default probability π=1%. Each counterparty is assigned to a country so that there are 25 from each country. The weights $a_k$ and $\lambda_k$ (k=1, ..., 200) are generated as follows. For $\lambda_k$ we randomly choose values between 20% and 60%, which are common in credit modelling. Each counterparty is then described by two different risk factors (labelled $i_1$ and $i_2$) from the country to which it has been assigned, and the value of $a_k^{i_1}$ (and hence also that of $a_k^{i_2}$) are drawn from a uniform distribution on (0,1) such that $a_k^{i_1} + a_k^{i_2} = 1$. Moreover, each counterparty has a total exposure of 1000 CHF and the loss given default is assumed to be uniformly distributed on [0,1].

500'000 simulations were performed using a 92-dimensional Sobol sequence. The simulated default frequencies were all in the range 0.97%-1.03% and the expected value of the portfolio loss distribution was estimated with less than 0.2% error.

In the following the results are presented by making a comparison between our new system incorporating the grouped t-copula (with degrees of freedom parameters shown in Table 1) and (1) a model with a t-copula (with 29 degrees of freedom) and (2) a model with a Gaussian copula. The Gaussian model was taken as baseline and the differences in the risk measures were expressed as percentages. In Table 2 the various risk measures for the total credit loss distribution are shown. Taking the tail dependence into account with the t-copula gives an increased assessment of the risk. By introducing the grouped t-copula, even larger risk measures were received. The 99%-shortfall is in this case more than 10% larger than in the normal case.

| Measure | $T_{29}$ | grouped-t |
| --- | --- | --- |
| Max. value | 29.7% | 41.4% |
| Std dev. | 4.2% | 5.3% |
| 95% quantile | 1.1% | 1.7% |
| 99% quantile | 4.3% | 6.0% |
| 95% shortfall | 3.4% | 4.8% |
| 99% shortfall | 8.9% | 10.8% |

Table 2: Risk measures of the sample portfolio using a $t_{29}$-copula or a grouped t-copula to model the dependence among the 92 risk factors. The values shown are the percentage deviations from those obtained with the normal copula.

The above described inventive method is preferably performed by use of a data processing system using at least one computer. This system S as shown in FIG. 1 comprises modelling and calibration means Mod/Cal, this means Mod/Cal comprising a program which describes d risk factors as random variables $X_1$ to $X_d$, the random variables being related to each other by a correlation matrix ρ, wherein this means form m groups of the random variables $X_1$ to $X_d$, describe the random variables $X_1$ to $X_d$ as a d-dimensional random vector X, thereby forming m subvectors, each subvector consisting of one group of the random variables $X_1$ to $X_d$ describe the dependencies of the risk factors as the implicit copula of a d-dimensional random vector Y, this random vector Y consisting of m subvectors $Y_k$ (k=1 to m, m≠1), wherein each subvector $Y_k$ has a t-distribution with a parameter $v_k$, this parameter describing a degree of freedom, and wherein its copula being a t-copula; wherein d, m and k are natural positive numbers;

input means (a, b, c)

for entering or choosing calibration data for obtaining by using the modelling and calibration means values for the $v_k$ degrees of freedom parameters for each of the m subvectors $Y_k$ separately and for obtaining values for the correlation matrix ρ for all the random variables $X_1$ to $X_d$, for entering or choosing at least one risk mapping function L(X), in particular a profit and loss function, and for entering portfolio data of the portfolio to be analysed;

simulation means SIM for simulating realisation of the d risk factors by using the calibrated correlation matrix ρ, the calibrated values $v_k$ of the degrees of freedom parameters, the risk mapping function L(X) and the portfolio data of the portfolio and output means for showing the output data of the simulation in the form of a risk measure or a price.

In a preferred embodiment, the system comprises at least three input levels:

a first level comprising a first input means (a) for entering or choosing the calibration data, wherein these data are used by the modelling and calibration means Mod/Cal;

a second level comprising a second input means (b) for entering or choosing at least one risk mapping function L(X), wherein this function is preferably handled by a risk mapping means RM; this risk mapping means RM can be a stand alone means or being part of the simulation means SIM; and a third level with third input means (c) for entering the specific portfolio data being used by the simulation means SIM.

The calibration data are all the data needed for calibrating the model. Usually, they comprise historical data, marginals and information concerning the groups to be formed, i.e. a maximum number of groups and the information in view of which aspects or criteria the groups are formed. The risk mapping function is preferably a profit and loss function and it depends of the general type of portfolio to be analysed. The portfolio data depend on the specific portfolio to be analysed and can change daily.

The calibration is performed periodically, for example once a year, with updated data. The risk mapping function must only be changed when a new general type of portfolio is entered. The portfolio data are entered more often, i.e. each time, when an updated risk measure or a new prize shall be obtained. Depending on the kind of business and the kind of portfolio, this is usually done daily or at least once a week.

The system can be used by different users, which allows the users to have different levels of mathematical understanding. The modelling and calibration steps are usually performed by a first person, this person usually having a fundamental mathematical background. The risk mapping step is performed by a second person, who is usually a well trained senior risk analyst and has preferably some sort of mathematical background. The simulation is done by a risk analyst being responsible for the portfolio.

Figure 2:
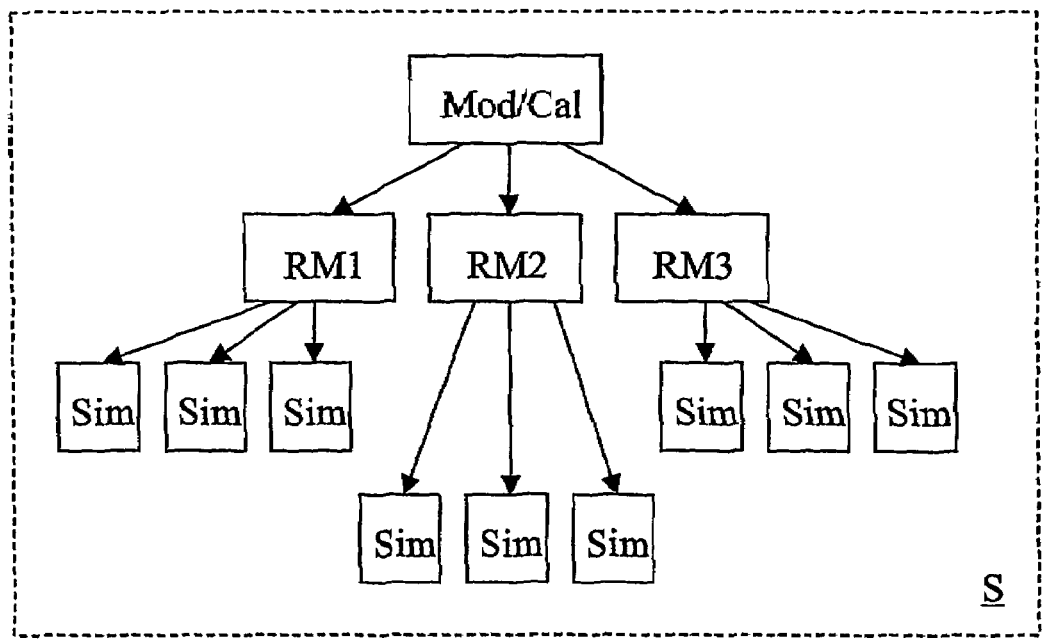

As can be seen in FIG. 2, the system also allows to perform simulation with different types of portfolios and with different portfolios within the same type, thereby using the same modelling and calibration means Mod/Cal. The calibration data then comprise information about all the portfolios to be handled. For example, when a first portfolio comprises 50' equities of 10 countries and a second portfolio comprises 70 equities of 20 countries, 30 of the equities and 5 of the countries being the same as in the first portfolio, the calibration data consider 90 different kinds of equities and can define 25 groups of different countries. For each type of portfolio, there exists a separate risk mapping means RM for entering the specific risk mapping function L(X). For each kind of portfolio, a separate simulation SIM can be performed.

In a preferred embodiment of the system S, the system comprises a data storage for storing the historical data. However, it is also possible to store the historical data on other means and to transfer it into the system when performing the calibration. It is also possible to use a different computer or subsystem for the calibration and the simulation, transferring the data from the calibration computer or subsystem to the simulation computer or subsystem. The inventive system may then comprise storing means for storing the calibrated correlation matrix ρ and the calibrated parameters $v_k$ describing the degrees of freedom. Like this, simulations can be run on different computers at the same time.

Preferably, the inventive system further comprises input means for grouping the d interdependent risk factors manually or for choosing manually a grouping from a range of several kind of groupings. This enables a user to group the risk factors according to the countries or according to the industrial sectors or other criteria.

As can be seen, grouping the t-copulas enables to model large sets of risk factors of different classes. This grouped t-copula has the property that the random variables within each group have a t-copula with possibly different degrees of freedom parameters in the different groups. This gives a more flexible overall dependence structure more suitable for large sets of risk factors. When calibrated to a historical risk factor data set, the system allows to more accurately model the tail dependence present in the data than the popular Gaussian and t-copulas.

The invention claimed is:

1. A computerized data processing system including a computer for performing risk analysis of a portfolio, the system comprising:
   a modeling and calibration unit implemented on the computer, configured to describe d risk factors as random variables $X_1$ to $X_d$, the random variables being related to each other by a correlation matrix ρ, to form m groups of the random variables $X_1$ to $X_d$, to describe the random variables $X_1$ to $X_d$ as a d-dimensional random vector X, forming m subvectors, each subvector including one group of the random variables $X_1$ to $X_d$, and to describe dependencies of the risk factors as the implicit copula of a d-dimensional random vector Y, the random vector Y including m subvectors $Y_k$ (k=1 to m, m≠1, d, m, and k are natural positive numbers), each subvector $Y_k$ has a t-distribution with a parameter $v_k$ describing a degree of freedom, and a copula of each subvector $Y_k$ is a t-copula;
   an input unit implemented on the computer, configured to enter or choose calibration data to obtain, by using the modeling and calibration unit, values for the $v_k$ describing the degree of freedom for each of the m subvectors $Y_k$ separately and to obtain values for a correlation matrix ρ for the random variables $X_1$ to $X_d$, to enter or choose at least one risk mapping function L(X), and to enter portfolio data of the portfolio to be analyzed;
   a simulation unit implemented on the computer, configured to simulating realization of the d risk factors by using the correlation matrix ρ, the parameters $v_k$ describing the degrees of freedom, the at least one risk mapping function L(X), and portfolio data of the portfolio; and
   an output unit implemented on the computer, configured to generate output data resulting form the simulation unit in a form of at least one of a risk measure or a price.

2. The computerized system according to claim 1, wherein the
   input unit is further configured to enter at least three input levels, a first level including a first input unit configured to enter or choose the calibration data, a second level including a second input unit configured to enter or choose the least one risk mapping function L(X), and a third level with third input unit configured to enter the portfolio data.

3. The computerized system according to claim 1, further comprising a data storage unit configured to store the historical data.

4. The computerized system according to claim 1, wherein the
   input unit is further configured to group the d risk factors manually or configured to manually choose a grouping from a range of several kind of groupings.

5. The computerized system according to claim 1, further comprising:
   a storing unit in the computer configured to store the correlation matrix ρ and the parameters $v_k$ describing the degrees of freedom.

6. A computer implemented method for performing risk analysis of a portfolio on a computer by combining d interdependent risk factors to determine a risk measure or a price, the method comprising:
   a step of building a model with the computer by
      describing the d risk factors as random variables $X_1$ to $X_d$ being related to each other by a correlation matrix ρ,
      forming m groups of the random variables $X_1$ to $X_d$,
      describing the random variables $X_1$ to $X_d$ as a d-dimensional random vector X to form m subvectors, each subvector including one group of the random variables $X_1$ to $X_d$, and
      describing dependencies of the d risk factors as an implicit copula of a d-dimensional random vector Y, the random vector Y including m subvectors $Y_k$ (k=1 to m), wherein each subvector $Y_k$ has a t-distribution with unknown values of parameters $V_k$, the values of parameters $V_k$ describing degrees of freedom, and wherein a copula of the values of parameters $V_k$ being a t-copula;
   a step of calibrating the model with the computer of said step of building by using historical data to obtain values for the parameters $V_k$, describing degrees of freedom for each of the m subvectors $Y_k$ separately, and to obtain values for the correlation matrix ρ for all the random variables $X_1$ to $X_d$, wherein d, m and k are natural positive numbers;
   a step of simulating realization of the d risk factors with the computer by using the calibrated model of the step of calibrating; and
   a step of generating output data with the computer in form of at least one of a risk measure or price based on said step of simulating.

7. The method according to claim 6, wherein d is equal or greater than 4 and each group of the random variables $X_1$ to $X_d$ includes at least two random variables.

8. The method according to claim 6, wherein in said step of simulating on the computer, Kendal's tau is estimated for every group of subvectors $Y_k$.

9. The method according to claim 6, wherein said step of calibrating the model with the computer further comprises a maximum likelihood estimation of the m degrees of freedom.

10. The method according to claim 6, wherein the random variables $X_1$ to $X_d$ are grouped in m groups according to predefined aspects, countries, or industrial sectors.

11. The method according to claim 6, wherein said step of building a module with the computer further comprises building the model by specifying normally distributed marginals.

* * * * *